A. L. HADLEY.
DYNAMO ELECTRIC MACHINE.
APPLICATION FILED MAY 14, 1906.
901,440.  Patented Oct. 20, 1908.
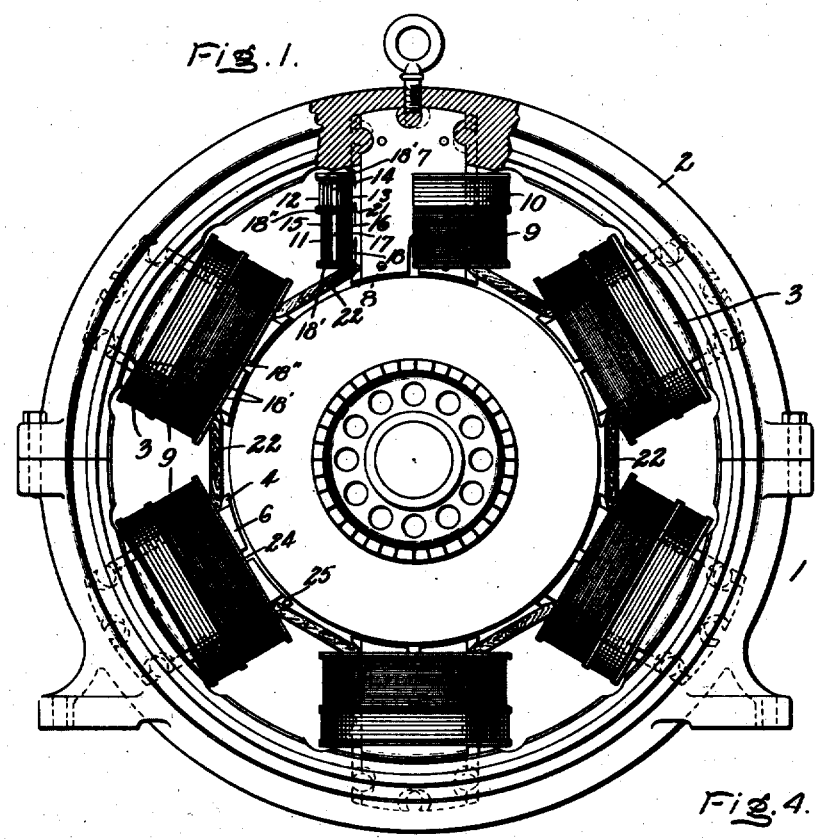
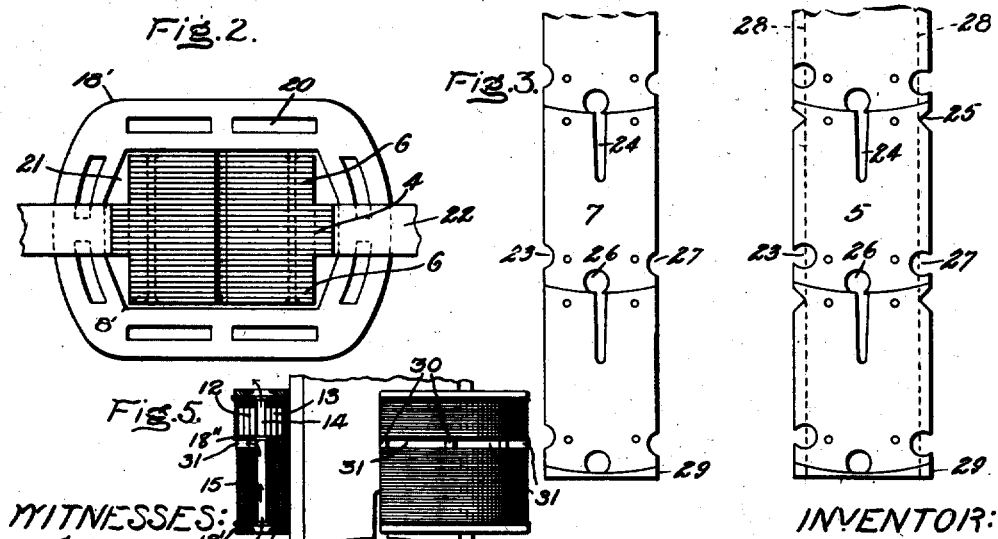
WITNESSES:
F. J. Dore
Helen Orford
INVENTOR:
Arthur L. Hadley,
By Albert G. Davis
Att'y

UNITED STATES PATENT OFFICE.

ARTHUR L. HADLEY, OF FORT WAYNE, INDIANA, ASSIGNOR TO GENERAL ELECTRIC COMPANY, A CORPORATION OF NEW YORK.

DYNAMO-ELECTRIC MACHINE.

No. 901,440.

Specification of Letters Patent.

Patented Oct. 20, 1908.

Application filed May 14, 1906. Serial No. 316,601.

*To all whom it may concern:*

Be it known that I, ARTHUR L. HADLEY, a citizen of the United States, residing at Fort Wayne, county of Allen, State of Indiana, have invented certain new and useful Improvements in Dynamo-Electric Machines, of which the following is a specification.

My present invention relates to dynamo-electric machines, and comprises certain improvements in the construction and arrangement of field magnets for such machines.

The various features of novelty which characterize my invention are pointed out with particularity in the claims annexed to and forming a part of this specification. For a better understanding of my invention, however, and the advantages possessed by it, reference may be had to the accompanying drawings and descriptive matter in which I have illustrated and described one of the ways in which my invention may be carried out.

In the drawings, Figure 1 is an elevation of a portion of a dynamo-electric machine partly broken away and in section; Fig. 2 is a plan view of a field pole and winding therefor looking at the armature end of the pole; Fig. 3 is a plan view of a series of punchings of one form employed, illustrating the manner in which they are cut from stock; Fig. 4 is a view similar to Fig. 3 showing a different form of punching used; and Fig. 5 is an elevation of a field pole and winding with the latter broken away and in section, illustrating a modification.

Referring to the drawings, 1 represents the stationary field member of an internally-revolving armature of a dynamo-electric machine. The field member comprises a field ring 2 and internally-projecting pole pieces 3. The pole pieces 3 each comprise a central bundle or unit 4 of laminæ 5 placed between two bundles 6 of laminæ 7. The bundles 6 are similar to each other and though somewhat narrower are substantially similar to bundle 4. In the form of my invention shown the bundles 4 and 6 forming each pole piece are secured together by rivets 8, and have their ends remote from the armature, cast into the field ring 2.

The winding 9 surrounding each pole piece may be of any suitable form, though it may be advantageously made oblong as shown. In the construction shown in detail, the winding for each pole comprises a series coil 10 and a shunt coil 11. Each coil 10 is divided into two sections 12 and 13 separated by a ventilating space or passage 14. Similarly, each coil 11 is divided into two sections 15 and 16 separated by a ventilating space 17. The adjacent ends of the ventilating spaces 14 and 17 in each winding are in register. The coils 10 and 11 for each pole may be assembled on a single spool 18 provided with end members 18′ and an intermediate member 18″ separating the coils 10 and 11. Apertures 20 are formed in the member 18′ and 18″ which register with the ventilating spaces 14 and 17. The spools may be practically of any desired shape, but are so formed that ventilating passages 21 are formed between them, the ends of the bundles 6 and the portions of the bundle 4 projecting by the edges of the corresponding bundles 4. The windings are secured in place on the field pole by bridges 22 which may be of any suitable material, such as wood. As shown, the opposite ends of each bridge member 22 enter notches 25 formed in the armature end of the punchings 5 forming the central portion of adjacent field poles.

With the construction described, air set in motion by the rotation of the armature passes radially away from the armature through the channels or passages 21 and through the passages 14 and 17 in the windings. This insures a very efficient ventilation of the field poles and windings. By making the laminæ 5 of each field pole wider than the corresponding laminæ 7, a flux distribution is obtained which facilitates commutation in a manner well known to those skilled in the art. These advantages are obtained with a construction which is simple and compact and may be economically assembled.

I have found that the punchings 5 may be advantageously formed by cutting them from a strip of the same width as the punchings in the manner shown in Fig. 4. Each punching has its armature end approximately concentric with the axis of rotation of the armature and the ends of the punching remote from the armature of the same curvature. As a result, each punching 5 may be formed by a simple die-cutting or punching operation in which the punching is severed from the stock strip and the notches 23, 24, 25, 26 and 27, if desired, may be formed at the same time. The notches 24 are for the purpose of preventing injurious cross-flux in the pole tips, due to the armature reaction. The notches 23, 26 and 27 are formed for the purpose of facilitating the production of a firm and reliable connection of the punchings with the cast ring 2.

The punchings 7 may be formed by the same dies employed in cutting or punching out the punchings 5. In Fig. 4 the dotted lines 28, representing the outline of a strip from which the punchings 7 are formed and the outline of the punchings 5, show the relative position of the two stock strips with reference to the die-cutting or punching apparatus used.

Of course, the notches 23 and 27 formed in the punchings 7 are not as deep as in the punchings 5, but this is of no material disadvantage. By forming the punchings in the manner described, an extremely efficient use of stock from which the laminæ are cut is obtained. This stock, which may come in sheets of indefinite length and widths, is cut into strips the width of the punchings 7 and 5, and the only material in a long strip wasted, aside from the materials cut out in forming the notches 23, 24, 25, 26 and 27, consists of an end piece 29 and a corresponding piece at the opposite end of the strip.

It will be understood that the dies employed for making the punchings 5 and 7 may also be employed for forming punchings without waste from strips slightly wider or narrower than the punchings 5 and 7, if desired.

It will be observed that the notches 26 are not exactly midway between the side edges of the punchings, and that the notches 23 and 27 at opposite sides of each punching are not directly opposed to each other.

In assembling each field pole certain of the punchings are reversed with respect to each other, so that the various notches 26 are not in exact register with each other, and the notches 23 and 27 at each side of the pole piece are also more or less out of register. This improves the connection between the field pole and the field ring.

Instead of forming the windings as shown in Fig. 1, I may form them as shown in Fig. 5 where the upper end of the shunt coil section 15 is spaced away from the intermediate member 18″ in any suitable manner as by spacing blocks 30. As a result of this construction, air entering the armature end of the passage 17 may pass out partly through the passage 14 and partly through the passages 31 between the outer end of the coil section 15, the member 18″ and the blocks 30. This arrangement of the ventilating means has been found to be quite advantageous under some circumstances.

While the particular forms of my invention disclosed have been found to give excellent results in practice, it will be understood that my invention is not limited in all of its aspects to the particular embodiments disclosed, and that certain features of my invention may be used without a corresponding use of other features,—and I do not wish the claims hereinafter made to be limited to the embodiment disclosed more than is made necessary by the state of the art.

What I claim as new and desire to secure by Letters Patent of the United States, is:

1. In a commutating dynamo electric machine, a field pole comprising a central section of laminæ interposed between two side sections of laminæ, the laminæ forming the central section being wider than the laminæ in the side sections.

2. In a commutating dynamo electric machine, field poles each composed of a central bundle of laminæ placed between two other bundles of laminæ, the laminæ forming the central bundle being wider than the other laminæ and arranged so that each side of the central bundle projects by the corresponding edges of the other bundles.

3. In a dynamo electric machine, a winding, and a field pole surrounded thereby, said field pole comprising a central section of laminæ placed between two side sections of laminæ, the laminæ forming the central section being wider than the other laminæ whereby ventilating spaces are formed between the central and side sections and the windings.

4. In a dynamo electric machine, a winding, a field pole surrounded by said winding, said field pole consisting of a central section of laminæ interposed between two side sections, the laminæ forming the central section being wider than those of the other sections whereby ventilating spaces are formed between the central and side sections and the winding.

5. In a dynamo electric machine, a field pole composed of a central bundle of laminæ placed between two other bundles of laminæ, the laminæ forming the central bundle being wider than the other laminæ and arranged so that each side edge of the central bundle projects by the corresponding edges of the other bundles, windings on each of said field poles, and a winding support extending between each adjacent pair of field poles, each winding support engaging the central bundle of the corresponding field pole.

6. In a dynamo electric machine, a laminated field pole composed of laminæ, some of which are wider than others, the wider laminæ having notches formed in them, and coil retaining devices entering said notches.

7. In a dynamo electric machine, a field pole composed of laminæ, some of which are wider than others, but all of which are of the same length, each lamina having its armature end substantially concentric with the axis of the machine, and its opposite end of the same curvature as the armature end, said laminæ having notches formed in their side edges, the distance between the adjacent sides of the notches in the opposite edges of each lamina being equal to the corresponding distances of the other laminæ whereby the narrow and wide laminæ may be formed by the same dies.

8. In a field magnet structure, comprising laminated field poles cast into a cast metal yoke, said field poles each composed of laminæ, some of which are wider than others, and all of which are of the same length, each of said laminæ having notches formed in the side edges of the portion embedded in said yoke, the distance between adjacent sides of the notches in opposite edges of each lamina being equal to the corresponding distance in every other lamina, the wider laminæ having notches formed in their opposite side edges at their armature ends to receive coil-retaining devices, the distance between the last-mentioned notches in opposite edges of each wide lamina being not less than the width of each narrower lamina, whereby the narrow and wide laminæ may be formed by the same dies.

In witness whereof, I have hereunto set my hand this tenth day of May, 1906.

ARTHUR L. HADLEY.

Witnesses:
    JAMES J. WOOD,
    T. W. BEHAN.